United States Patent [19]
Neff et al.

[11] 3,994,803
[45] Nov. 30, 1976

[54] APPARATUS AND METHOD FOR DENITRIFICATION OF WASTE WATER

[76] Inventors: Harold P. Neff, c/o Lyco- ZF, P.O. Box 450, 153 W. Fourth St., Williamsport, Pa. 17701; John T. Graham, c/o John T. Graham, 200 Cedarbrook Road, Ardmore, Pa. 19003

[22] Filed: July 7, 1975

[21] Appl. No.: 593,747

[52] U.S. Cl. .................................. 210/8; 210/11; 210/80; 210/82; 210/195 R; 210/275
[51] Int. Cl.² ..................................... C02C 1/06
[58] Field of Search .................................. 210/5-8, 210/11, 16, 82, 108, 195 R, 197, 198 R, 209, 274, 275, 80

[56] References Cited
UNITED STATES PATENTS

| | | | |
|---|---|---|---|
| 2,888,140 | 5/1959 | Hebert | 210/275 |
| 3,286,842 | 11/1966 | De Jong | 210/275 |
| 3,709,364 | 1/1973 | Savage | 210/275 X |
| 3,713,543 | 1/1973 | Heaney | 210/275 X |
| 3,817,378 | 6/1974 | Ross | 210/275 X |
| 3,829,377 | 8/1974 | Hashimoato | 210/11 |

*Primary Examiner*—Charles N. Hart
*Assistant Examiner*—Robert H. Spitzer
*Attorney, Agent, or Firm*—Melville, Strasser, Foster & Hoffman

[57] ABSTRACT

Apparatus and method for periodic backwashing and inoculating with anaerobic denitrifying bacteria a columnar filter bed in a waste water treatment system. A minor portion of backwash water containing a substantial quantity of denitrifying bacteria is retained for return to the filter bed media by gravity flow after completion of the backwash cycle. The apparatus and method have particular utility in an activated sludge sewage treatment system the effluent from which contains nitrates (converted from organic nitrogen and ammonia) and suspended solids which are removed in a filter bed comprising several discrete layers of filter sand of different particle sizes supported on coarse gravel.

12 Claims, 5 Drawing Figures

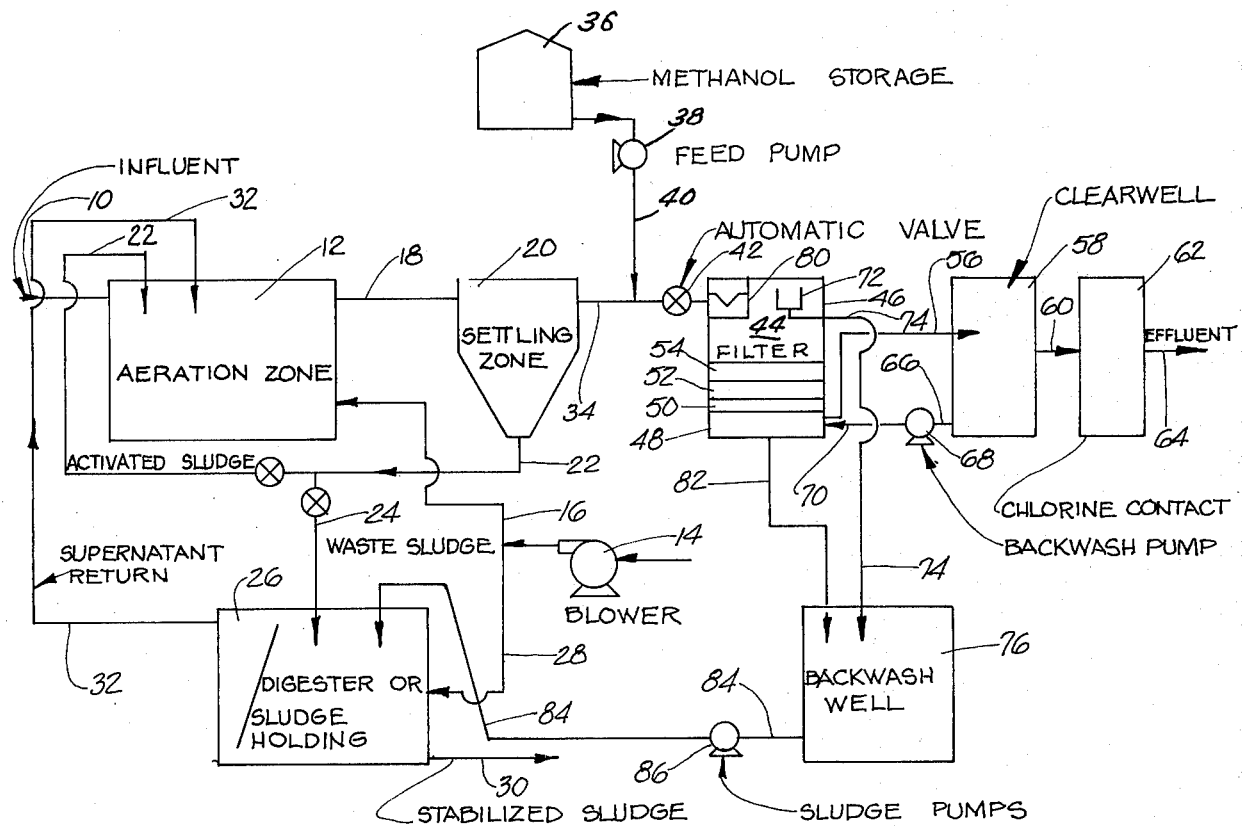
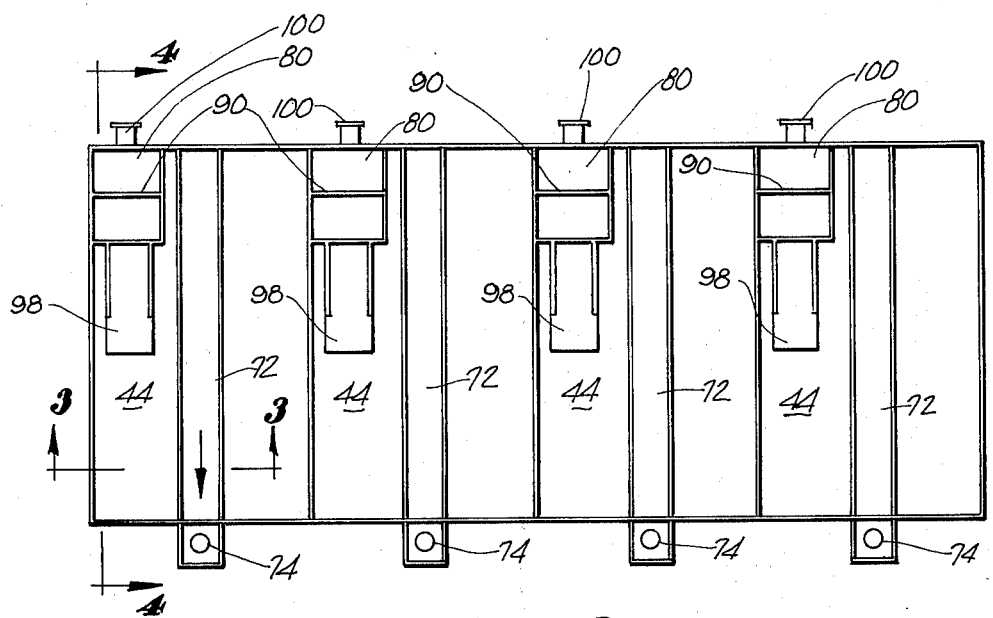

3,994,803

APPARATUS AND METHOD FOR DENITRIFICATION OF WASTE WATER

BACKGROUND OF THE INVENTION

1. Field of the Invention

This invention relates to a method and apparatus for denitrification of the effluent from an activated sludge sewage treatment system containing nitrogen compounds in the form of nitrates and nitrites by passage through a columnar filter, the filter media of which contain bacteria which convert the nitrogen compounds to nitrogen gas, with simultaneous removal of suspended solids. More particularly, the method and apparatus of this invention relate to periodic backwash of the filter with retention of a portion of the denitrifying bacteria which are then returned to the filter media to inoculate or "reseed" the filter for continued use.

2. Description of the Prior Art

Recent requirements in pollution control have placed limitations on the discharge of nitrogen compounds in treated sewage effluent into streams, and removal of such nitrogen compounds has thus received considerable attention.

Removal of nitrogen from waste water by the use of denitrifying bacteria involves, first, conversion of organic nitrogen and ammonia into nitrates, followed by removal of the oxygen by denitrifying bacteria to yield nitrogen gas. In each stage, the intermediate compounds are nitrites.

In the conversion of organic nitrogen and ammonia to nitrates adequate aeration must be provided, and this aerobic process also results in removal of carbon. However, carbon must be present during the denitrification by dentrifying bacteria. Accordingly carbon has to be reintroduced into the system, and this is commonly done by addition of methanol. The biochemical reaction which occurs when methanol is used as the carbon source results in production of nitrogen gas, carbon dioxide and water. The amount of methanol required is about three times the weight of nitrogen compounds to be removed. As is known in the art, other carbon sources can be used.

U.S. Pat. No. 3,709,364, issued Jan. 9, 1973, to E. S. Savage, discloses a method and apparatus for denitrification and clarification of nitrate-containing waste water, particularly adapted for sewage treatment. In this patent a filter bed is provided having a depth in excess of three feet with filter media comprising hard, rounded, gravel-like quartz sand of a size between 1–6 mm diameter. Denitrifying bacteria are supplied to the filter media.

Means are provided for periodic backwashing of the filter in the Savage system, whereby clean water is forced into the bottom portion of the filter, passed upwardly through a reticulated bottom, through the filter media and discharged to a backwash well. The backwash water is then returned to the aeration zone. In order to prevent removal of the entire denitrifying bacteria colony from the filter media during backwash, the patentee proposes several alternatives, one being diversion of a portion of the backwash dirty water from the backwash well to the influent line to the filter. Alternatively backwashing may be carried out by shortening the backwash cycle to the extent that a portion of the solids in the filter bed are retained, or a major portion of the filter bed may be backwashed while a minor portion at the bottom thereof is subjected to only slight backwashing. It will of course be recognized that complete backwashing is necessary in order to remove collected solids from the filter and to liberate trapped bubbles of nitrogen gas which accumulate in the filter bed.

The procedure of pumping backwash dirty water to the backwash well and then pumping a portion of the backwash dirty water back to the influent to the filter is undesirable in that additional pumps, connecting conduits, valving, controls therefor are required, and in that the concentration of bacteria in the backwash well is very low, thus requiring the return of a large volume of backwash dirty water in order to inoculate the filter bed with a sufficient proportion of the bacteria colony. The alternatives proposed by the patentee, such as shortening the backwash cycle or backwashing only the upper portion of the filter bed, obviously result in incomplete removal of collected solids and trapped bubbles of nitrogen gas, thus decreasing the efficiency of the filter bed when it is returned to use.

SUMMARY

It is a principal object of the present invention to provide a method and apparatus for backwashing and inoculating a filter bed with denitrifying bacteria which avoid the disadvantages of the prior art system discussed above, which is automatic, and which avoids sophisticated electrical and mechanical controls.

It is a further object of the invention to provide a method and apparatus for inoculating with denitrifying bacteria a columnar filter bed comprised of a plurality of discrete layers of filter media comprising, e.g., a top layer of 1.5 mm sharp sand, a second layer of 2.5 – 3 mm sharp sand, a third layer of pea gravel and a bottom layer of 2-B gravel supported by a reticulated bottom. The depth of such a filter bed is at least 6 feet. Although not so limited, the apparatus and method of the present invention have particular utility in reseeding or inoculating such a filter bed.

In its broad aspects the method of the present invention as applied to backwashing a columnar filter bed containing a colony of anaerobic denitrifying bacteria, comprises the steps of forcing clean water upwardly through the filter bed to a level above the top surface thereof whereby to carry upwardly collected solids and trapped bubbles of nitrogen gas from the bed, withdrawing a major portion of the water by gravity flow, collecting a minor portion of the water by gravity flow in a container positioned above the top surface of the bed, the minor portion containing a substantial portion of the colony of bacteria together with some solids, discontinuing the flow of clean water upwardly through the bed and permitting the water level to recede below the bottom thereof, and releasing the minor portion of the water in the container to flow by gravity onto the filter bed when normal operation is resumed, whereby to inoculate the bed with the portion of bacteria in the minor portion of water.

According to the invention, apparatus for backwashing a filter bed containing a colony of anaerobic denitrifying bacteria comprises a housing for the bed, means for forcing clean water upwardly through the filter bed to a level above the top surface thereof, a trough positioned above the bed at a level such that a major portion of the water will flow thereinto by gravity and be conducted away from the housing, a container having an open top positioned above the bed and within the housing at a level such that the water will flow thereinto by gravity, the capacity of the container being limited to accommodate a minor portion of the backwash water, means for discontinuing flow of the clean water after a predetermined period of time, means for withdrawing the water remaining in the housing, and means to release the minor portion of water in the container (and the bacteria therein) to flow by gravity onto the bed when normal operation of the filter is resumed.

Preferably the capacity of the container provided to retain the minor portion of water is about 1% of the scheduled volume of backwash water. This will be sufficient to provide an application of about 0.7 to about 1 gallon per square foot of filter surface area when the water is returned to the bed.

BRIEF DESCRIPTION OF THE DRAWINGS

Reference is made to the accompanying drawings wherein:

FIG. 1 is a diagrammatic illustration of the principal components of a sewage treatment system embodying the invention;

FIG. 2 is a top plan view of a battery of filter cells in accordance with the invention;

DESCRIPTION OF THE PREFERRED EMBODIMENTS

Figure 3:
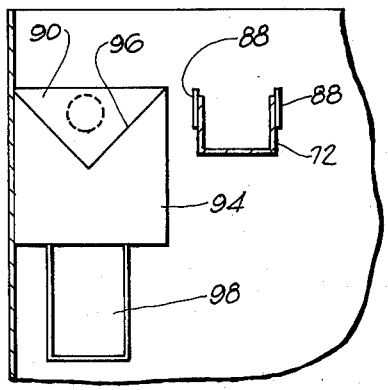
FIG. 3 is a sectional view taken along the line 3—3 of FIG. 2.

Referring to FIG. 1, raw sewage is introduced through an influent line 10 to an aeration zone 12 into which air is injected in the form of small bubbles by a blower 14 through line 16. Activated sludge returned to the aeration zone from a subsequent step as described hereafter is mixed with the raw sewage in the aeration zone. Activated organisms in the sludge act upon the organic nitrogen compounds and ammonia in the raw sewage to form nitrates by oxidation with the oxygen bubbled through the zone. Liquid from the aeration zone 12 is then transferred through line 18 to a settling zone 20 which may be provided with collecting means (not shown) such as an airlift pump. Solid particles settle to the bottom of zone 20, and a portion of this activated solid sludge is introduced through line 22 to the aeration zone 12 as indicated above. The remainder of the sludge is carried by line 24 to a digester or sludge-holding tank 26 where it is contacted with air from blower 14 introduced through line 28. The organic material is biologically decomposed in digester 26 by oxidation to form a harmless residue which may be discharged as stabilized or waste sludge through line 30. Supernatant liquid from the upper portion of the digester 26 may be returned through line 32 to aeration zone 12.

Effluent from the settling zone 20, still containing some suspended solid material, is discharged through line 34 and mixed with a source of carbon such as methanol supplied from a tank or other storage facility 36 and conducted through pump 38 through line 40 into line 34. Line 34 is provided with an automatic valve 42, the function of which will be described hereafter. The mixture is then introduced into a filter indicated generally at 44.

As indicated diagrammatically in FIG. 1, the filter 44 comprises a housing 46, a reticulated false bottom 48 on which is positioned a layer 50 of coarse gravel such as 2-B gravel. Above the coarse gravel layer there may be provided a further layer of pea gravel, followed in upward succession by a layer 52 of 2.5 - 3 mm sharp sand, and a layer 54 of 1.5 mm sharp sand. These filter media constitute the columnar filter bed and should be of a depth of at least 6 feet, the coarse gravel layer, or coarse gravel and pea gravel layers, being about 2 to 2.5 feet in depth, the layer of 2.5 - 3 mm sand being about 2.5 feet in depth and the layer of 1.5 mm sand being about 1.5 feet in depth. Additional layers of intermediate size particles could of course be provided if desired.

The mixture of effluent from the settling zone and methanol or other carbon source is introduced into the filter through line 34 and passes by gravity flow through the filter bed comprising the above described layers 50, 52 and 54 and through the reticulated bottom 48. Anaerobic denitrifying bacteria are present on the filter media, and during downward flow therethrough the bacteria convert the nitrates (and nitrites if still present) to nitrogen gas. At the same time residual solids in the effluent are removed and retained in the filter bed.

Although gravity flow has been indicated, the use of pressure to expedite passage of the effluent through the filter bed may be provided.

The denitrified and clarified filtrate passing through the reticulated bottom 48 is then conducted through discharge outlet 56 to a clearwell 58 and from the clearwell through line 60 to a chlorine contact zone to which chlorine is supplied. After conventional chlorination the final effluent is in a condition to be discharged as potable water through line 64 to a stream, reservoir, pond or other body of water.

The above described steps and elements are generally conventional in the art (with the exception of the provision of clearwell 58), and the description thereof is provided in order to facilitate a complete understanding of the invention. After an extended period of operation the filter bed collects a sufficient quantity of solids as to impede flow of the effluent and methanol mixture therethrough. Additionally, bubbles of nitrogen gas (and perhaps some carbon dioxide) become entrapped in the filter media, also decreasing the efficiency of the filter bed. Accordingly, means are provided for periodic backwashing of a filter bed. Since continuous operation is desirable, if not absolutely necessary, a plurality of filter beds is provided, four being shown by way of example in FIG. 2. When one or two beds require backwashing for removel of collected solids and trapped bubbles of nitrogen gas, flow of effluent from the settling zone is changed to one or two clean filters.

In accordance with the present invention means for periodic backwashing comprise a return line 66 from the clearwell 58 which carries clean water to a backwash pump 68, which in turn forces water through line 70 upwardly through the reticulated bottom 48 and through the layers 50, 52 and 54 of the filter bed. Air may also be introduced along with clean water in order to assist in agitating or "bumping" the filter media and removing solids which have been collected along with trapped gas bubbles.

The backwash water rises in the filter housing 46 to a level above the top surface of the filter bed, and means positioned above the bed are provided for conducting a major portion of the backwash water and solids collected thereby out of the filter housing. This comprises a backwash trough 72 as shown in FIGS. 1, 2 and 3. Water rising in the filter housing 46 overflows the edges of the trough and is withdrawn from the housing by gravity flow, the bottom of the trough sloping slightly toward an outlet which communicates with a conduit 74 leading to a backwash well 76, into which the backwash water and suspended solids flow by gravity.

Figure 4:
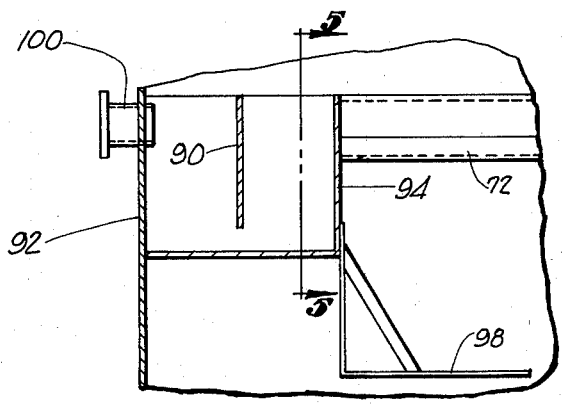
FIG. 4 is a sectional view taken along the line 4—4 of FIG. 2.

There is further provided a container 80, preferably in the form of a reseed or weir box as shown in FIGS. 2, 3 and 4. The weir box 80 has an open top and is positioned above the bed within the housing at a level substantially the same as the top of the backwash trough 72, so that upon reaching the desired level water will flow both into the backwash trough and into the weir box 80 by gravity. A proportionate quantity of the solids in the backwash water will of course also flow into and be retained in the weir box. However, there is essentially no velocity across the top of the weir box at this point since the major portion of the backwash water is being withdrawn by trough 72, and the solids will thus settle into the bottom of the weir box.

Upon completion of the backwash cycle the backwash pump 68 is inactivated, and the water level in the filter is permitted to recede below the reticulated bottom 48, the water being discharged by gravity flow, either into the clearwell 58, or (if desired) into the backwash well by a subsidiary line 82. The weir box still retains the backwash water, which contains a portion of the colony of denitrifying bacteris to reseed or innoculate the filter bed when it is returned to normal operation.

In the backwash well 76 solids removed from the filter by the backwash water are permitted to settle, and these solids are returned by line 84 through pump 86 to the digester 26 for aeration and discharge as stabilized sludge.

Preferred details of construction of the weir box 80 and trough 72 are shown in FIGS. 2–5.

The backwash trough is provided with adjustable leveling weirs, indicated diagrammatically at 88 in FIG. 3, for adjustment of the effective top level of the backwash trough. The top of the weir box is positioned so as to be at the same elevation as the top of the backwash trough when the leveling weirs 88 are at their lowest setting.

A transverse baffle 90 is provided in weir box 80 extending downwardly from the open top thereof with clearance at the bottom. This is positioned intermediate the end walls 92 and 94 of the weir box. The clearance between the bottom of the baffle and the bottom wall of the weir box is not critical but may be on the order of about 4 inches for a baffle plate of about 20 inches height.

Figure 5:
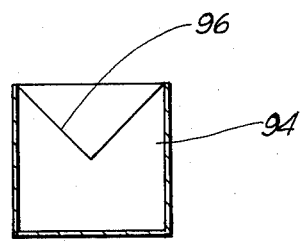
FIG. 5 is a vertical sectional view taken along the lines 5—5 of FIG. 4.

As shown in FIG. 5 the inner of "downstream" end wall 94 is formed with a V-notch 96 at the top thereof, the notch preferably being a 90° V and terminating about intermediate the top and bottom of the end wall. Upon inactivation of the backwash pump 68, the water level in the filter cell recedes rapidly, and the water in the upper portion of the weir box flows by gravity out of the V-notch 96 in end wall 94, falling downwardly upon a substantially horizontally disposed splash pad 98, which is of sheet metal construction and may be formed as the outer portion of a flanged element attached to the weir box as shown in FIG. 4. The water falling onto the splash pad is distributed over the surface of the filter bed.

A flanged pipe 100 is provided near the top of the weir box 80 passing through the outer end wall 92, which is connected to the automatic valve 42 and hence to line 34 which conducts the effluent from the settling zone 20. When the backwash pump 68 is activated, the automatic valve 42 is caused to close by an appropriate control (not shown), shutting off flow from the settling zone to the filter cell which is to be backwashed. When the backwash cycle has been completed, the automatic valve 42 is caused to open, permitting effluent from the settling zone to pass through line 34 and pipe 100 into weir box 80. The backwash water and bacteria retained in the weir box are then flushed out of the box by the incoming flow from the settling zone, and flow through the V-notch 96, falling onto the splash pad or plate 98 and thence into the filter. Since a substantial portion of the colony of bacteria (retained in the weir box) is thus returned to the filter bed, these quickly multiply to a sufficient extent to denitrify the effluent from the settling zone.

Since the water retained in the upper part of the weir box (above the V-notch) flows through the V-notch as soon as the backwash water level recedes, the effective capacity of the weir box is calculated as that volume below the bottom of the V-notch. As indicated previously, this volume preferably is about 1% of the scheduled volume of water used for backwash. The V-notch functions to direct the flow of water retained in the weir box and all effluent from the settling zone onto splash plate 98, and to provide a means of measuring the flow rate into the filter cell.

Flow of effluent from the settling zone through line 34, automatic valve 42 and pipe 100 into the weir box 80 passes under the baffle 90 before flowing out through the V-notch 96 onto the splash plate 98. solids entrained in the flow thus tend to be collected and retained on the bottom of the weir box. It will be apparent from the above description that backwash is effected with filtered water from the clearwell which has not been chlorinated. The use of chlorinated water for backwashing (as disclosed in the above-mentioned Savage U.S. Pat. No. 3,709,364) is not desirable since chlorinated water has an adverse effect on the biological activity of the denitrifying bacteria.

Moreover, the method of the present invention collects and retains in the weir box 80 the first washings of the filter bed which are the most concentrated and hence contain a high proportion of the colony of denitrifying bacteria. For this reason a relatively small volume of backwash water is sufficient to reseed the filter bed, as compared to pumping much more diluted dirty backwash water from a backwash well, since the backwash water gradually clears up as the bed is washed clean.

Modifications may be made without departing from the spirit and scope of the invention. Thus, while reference has been made above to a reticulated bottom in the filter housing which supports the filter bed, it is within the scope of the invention to substitute a different type of underdrain system, such as a network of perforated pipes positioned in the lowermost layer of coarse gravel. The type of underdrain system may thus be conventional and may be selected on the basis of the size of the filter.

The embodiments of the invention in which an exclusive property or privilege is claimed are defined as follows:

1. In apparatus for the treatment of sevage including an aeration zone for conversion of nitrogen-containing compounds within sewage to nitrates, a settling zone for separation of a nitrate-containing liquid from sludge produced in said aeration zone, a columnar filter bed containing a colony of anaerobic denitrifying bacteria, means for charging said nitrate-containing liquid from said settling zone to said filter, and means for periodically backwashing said filter bed including means for forcing clean water into the bottom of said filter and upwardly therethrough to a level above the surface of said filter bed, the improvement which comprises means for conducting a major portion of said clean water by gravity away from said filter, means for retaining a minor portion of said water above said bed, said minor portion of water also containing a portion of said colony of bacteria, means for discontinuing flow of said clean water after a predetermined period of time, means for withdrawing the water in said filter bed, and means for thereafter releasing said minor portion of water and said portion of bacteria therein to flow by gravity onto said bed, thereby inoculating said bed with said portion of said colony of bacteria, said releasing means including a conduit through which said nitrate-containing liquid is conducted into said retaining means to flush said minor portion of water and said portion of said colony of bacteria therefrom.

2. The improvement claimed in claim 1, wherein said means for retaining said minor portion of said water above said bed includes a container having an open top, top edges of said container being positioned slightly below said level above the surface of said bed whereby said water overflows said top edges and is collected in said container.

3. The improvement claimed in claim 2, wherein said means for releasing said minor portion of water includes a V-shaped notch in an end wall of said container terminating intermediate the top and bottom of said end wall, through which said minor portion of water falls by gravity onto said bed.

4. The improvement claimed in claim 3, wherein said container comprises a weir box having a capacity of about 1% of the scheduled volume of backwash water below said V-shaped notch.

5. The improvement claimed in claim 3, including a transverse baffle positioned intermediate end walls of said container and providing clearance between the bottom of said baffle and the bottom of said container.

6. The improvement claimed in claim 3, including a splash pad secured to said container beneath said V-shaped notch.

7. The improvement claimed in claim 2, wherein said means for conducting said major portion of said water away from said filter includes a trough having top edges positioned at substantially the same elevation as said top edges of said container.

8. The improvement claimed in claim 1, wherein said filter bed has a depth of at least six feet and comprises a plurality of discrete layers of filter media, the uppermost layer being sharp sand having an average particle size of about 1.5 mm, the next lower layer being sharp sand having a particle size of about 2.5 – 3 mmn, and at least one lower layer of coarse gravel.

9. A method of backwashing and inoculating a columnar filter bed containing a colony of anaerobic denitrifying bacteria, comprising the steps of forcing clean water upwardly through said filter bed to a level above the top surface of said bed whereby to carry upwardly collected solids and trapped bubbles of nitrogen gas, withdrawing a major portion of said water from above the top surface of said bed by gravity flow, collecting a minor portion of said water by gravity flow in a container positioned above the top surface of said bed, said minor portion containing a portion of said colony of bacteria, discontinuing the flow of clean water upwardly through said bed after a predetermined period of time, withdrawing said water to a level below the bottom of said bed, and introducing nitrate-containing liquid to be filtered into said container thereby flushing out said container and returning said minor portion of said water in said container to flow by gravity on said bed, whereby to inoculate said bed with said portion of bacteria.

10. The method claimed in claim 9, including the step of permitting the solids in said minor portion of water to settle to the bottom of said container.

11. The method claimed in claim 9, wherein said minor portion of water constitutes about 1% of said clean water forced upwardly through said filter bed.

12. The method claimed in claim 9, wherein said minor portion of water is returned through a V-shaped notch in a wall of said container spaced above the bottom thereof, to fall by gravity on said bed.

* * * * *